E. R. Morrison,
Cutting Shingles.
No 260.
Reissued Mar. 7, 1854.
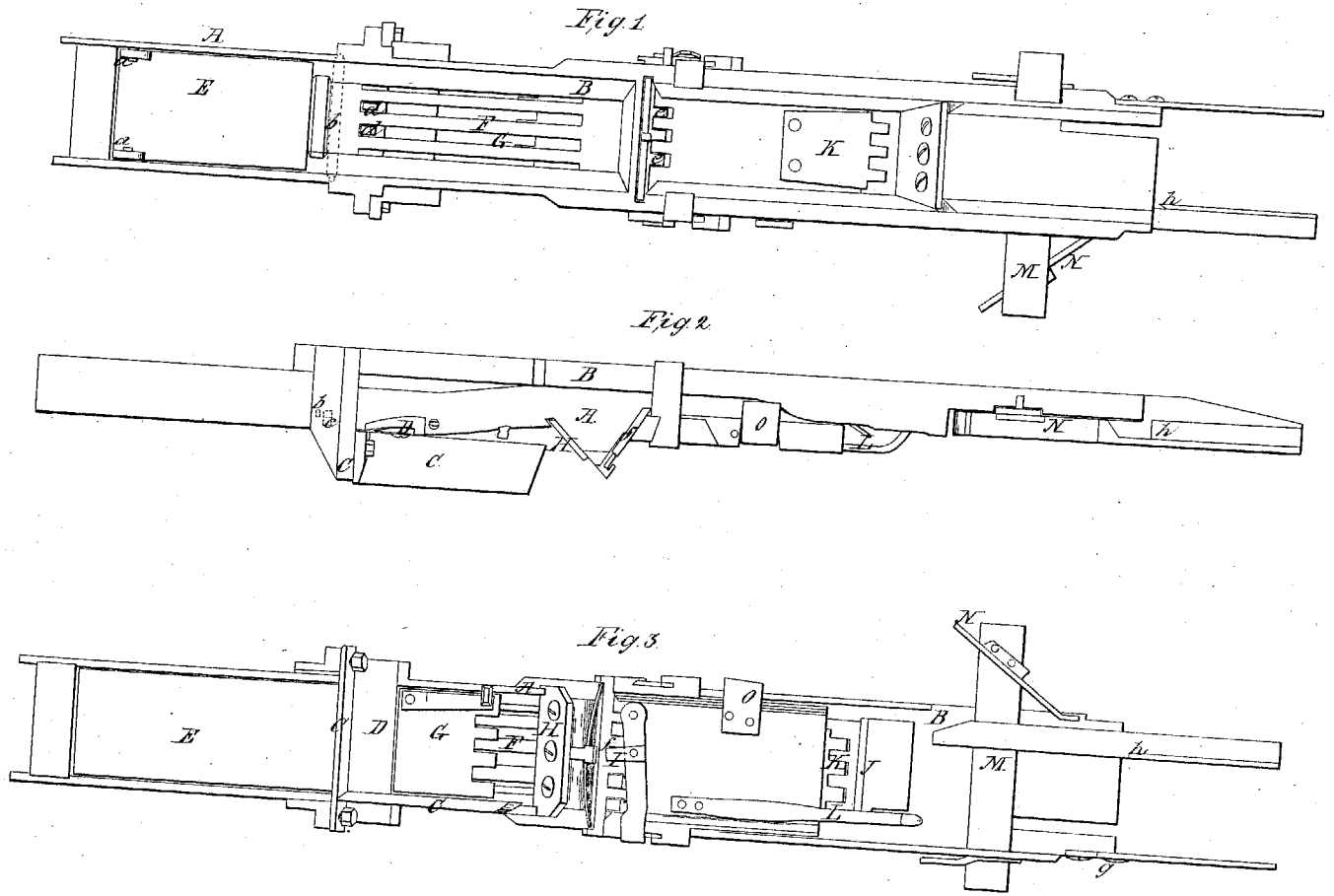
AM. PHOTO-LITHO. CO. N.Y. (OSBORNE'S PROCESS.)

UNITED STATES PATENT OFFICE.

ENOCH R. MORRISON, OF TROY, PENNSYLVANIA.

IMPROVED SHINGLE-MACHINE.

Specification forming part of Letters Patent No. 10,263, dated November 22, 1853; Reissue No. 260, dated March 7, 1854.

*To all whom it may concern:*

Be it known that I, ENOCH R. MORRISON, of Troy, in the county of Bradford and State of Pennsylvania, have invented certain new and useful Improvements in Machines for Riving, Shaving, and Edging Shingles; and I do hereby declare the following to be a full, clear, and exact description of the same, reference being had to the accompanying drawings, in which—

Figure 1 represents a view from the rear of the machine. Fig. 2 represents a view from the top thereof, and Fig. 3 represents a front view.

The nature of my invention consists in riving and carrying forward the riven shingle by an intermittent motion, so as to be operated upon successively by the shaving and edging knives, said motion being imparted by the reciprocating movement of the riving-knife stock through spring hooks, stops, dogs, or their equivalents.

To enable others skilled in the art to make and use my invention, I will proceed to describe the same with reference to the drawings.

The frame of the machine may be said to consist of two parts—a moving one, A, and a fixed one, B, the former sliding with a reciprocating movement against the latter, the power to operate the sliding frame being transmitted from any first mover through a pitman and crank, in a manner well known to mechanicians. The rest C, on which is placed the bolt from which the shingles are to be riven, is attached to the stationary half of the frame B, so that the other or moving part which carries the riving-knife D may pass underneath it. The bed E, against which the bolt is pressed, is hinged to the front end of the moving part of the frame, as seen at *a a*, Fig. 1, and the other end of the bed approaches the riving-knife D sufficiently near to form, as it were, a throat to that knife. The end of the bed next the riving-knife is held up to its place and against the pressure of the bolt by a spring, *b*, (in dotted lines, Fig. 1,) and is prevented from falling or spreading too far from the knife by lugs *c* on the bed, which pass through slots in the sides of the frame A, as seen in dotted lines in Fig. 2. The springs *b* should be stiff enough to resist the force of the bolt when pressed against it, but elastic enough to yield when the shingle being riven should increase in thickness in following the grain of the wood, either by "eating" into it, or by knots or otherwise. If the grain of the wood were perfectly straight, the spring-bed would be of little service; but my object being to rive with the grain of the wood, the yielding of the bed becomes actually necessary; otherwise the riving-knife must give way, as the inequalities in the grain of the wood must be provided for.

The bolt having been placed on the rest, (and I would here state that although I have not represented any machinery for holding and feeding up the bolt, yet such is in contemplation,) and the frame A, carrying the riving-knife D, having been drawn forward, a shingle is riven from the bolt and drops upon the second bed, F, which bed may be solid, but may be represented as formed of slats or open-work for the purpose of lightness, as the whole apparatus is of a portable character. When the sliding frame A returns for the next riving operation, the shingle previously riven is caught by the projection or dogs *d d*, which are permanently attached to the under side of the spring-bed E, and it is carried forward (and at the same time held down to the bed F by the spring plate G, Figs. 1 and 3) by said dogs *d d* until it is caught by the spring-dogs *e e*, Fig. 1, which rise up to receive or catch the end of a shingle after it has passed beyond them sufficiently far for that purpose. The riven shingle having thus been carried forward and caught by the spring-dogs *e e*, the sliding frame returns for the next riving operation, and the shaving-knife H, which is attached to it, passes over the shingle held to the stationary frame or bed and shaves or planes one side of it, the bed having such an inclination with the shaving-knife as to give the proper taper to the shingle when finished. While the knife H is shaving the shingle the spring-plate G is pressing it to the bed firmly and traveling with the knife, both being connected to the sliding half of the frame.

In rear of the shaving-knife H, and also attached to the sliding frame, is arranged another spring-dog, *f*, (having several projecting teeth,) which, after the shaving-knife H has passed sufficiently far beyond the end of the shingle for that purpose, is allowed to drop behind the shingle by the throwing out of a bolt, I, which previously held it up, said bolt being drawn out by striking against a pin or projection on the stationary frame. At this point the dogs *e e* are released or drawn out of the way, and the dogs *f* take their place. The next movement of the sliding frame carries the shingle forward by the dogs *f* to the second shaving-knife, J, which shaves the opposite side of the shingle, said knife J being attached to the fixed frame B, the rear portion of the moving part of the frame now becoming the bed against which the shingle is held by the spring-plate K, Figs. 1, 3.

In the first shaving operation it will be recollected that the shingle is held fixed and the shaving-knife travels over it. In the second shaving operation (or for shaving the side opposite to that first shaved) the operation is reversed, the shaving-knife being a fixture, and the shingle forced over and beyond it. In the first operation the fixed part of the frame is the bed. In the second case the moving part of the frame contains the bed, and said bed should be so inclined in relation to the knife as to give the shingle the proper taper on that side which it planes, as in the first case. The shingle is now shaved or dressed on both sides, the machine at each operation riving and advancing another shingle in regular succession, to be acted upon as the first one is, and is advanced far enough by the dogs *f* beyond the last shaving-knife to be caught by the pushing-piece L, which is attached to or may be an elongation of the rear of the sliding frame A. This piece L forces up the shingle against the edging or jointing knives, where it is finished and drops out of the machine. Thus by the simple reciprocating movement of the sliding frame a shingle is riven, advanced successively to the shaving and jointing knives, and finished. Each movement of the frame rives a shingle, while it advances those previously riven toward their completion, and the whole operation is performed by the motion which first rives the shingles from the bolt through the intervention of the dogs. There are two edging cutters or jointers, one of which, *g*, may be fixed, and the other or upper one, *h*, is hung in a sliding frame, M, so that it may rise and fall, as required, to suit the varied width of shingles as they pass through.

On the sliding frame or plate M is an inclined piece, N, under which a piece, O, attached to the sliding part of the frame A, moves and raises up the sliding piece M and the jointing-cutter on it, so that the next shingle in the series passing through may be properly presented to the jointers, and when presented the piece M is released and the jointer drops and rests upon the shingle, and when the shingle is advanced by the pushing-piece L it is edged and finished.

The bits or knives, the beds, and spring-plates may be made adjustable; but as this cannot be considered as invention it is deemed unnecessary to describe or represent them, being mechanical devices well known. The form, however, of the machine may be varied without in the least changing the character of the invention, which might be said to consist in riving, shaving, and jointing shingles by a single reciprocating movement of the frame, operating successively upon the shingles as they are driven through.

Having thus fully described the nature of my invention, what I claim therein as new, and desire to secure by Letters Patent, is—

Riving and carrying forward the riven shingle by the intermittently-reciprocating movement of the riving-knife stock or frame, so as to be operated upon successively by the shaving and edging knives, said motion being imparted by the movement of the riving-knife stock through the intervention of the spring hooks, stops, or dogs, or their equivalents, substantially as described.

ENOCH R. MORRISON.

Witnesses:
A. B. STOUGHTON,
SAML. GRUBB.